(12) United States Patent
Alfthan

(10) Patent No.: US 7,914,087 B2
(45) Date of Patent: Mar. 29, 2011

(54) AUTOMATIC TRACK TENSIONING SYSTEM

(75) Inventor: Arto Alfthan, Tarttila (FI)

(73) Assignee: Deere & Company, Moline, IL (US)

( * ) Notice: Subject to any disclaimer, the term of this patent is extended or adjusted under 35 U.S.C. 154(b) by 49 days.

(21) Appl. No.: 11/855,393

(22) Filed: Sep. 14, 2007

(65) Prior Publication Data

US 2009/0072617 A1    Mar. 19, 2009

(51) Int. Cl.
*B62D 55/14* (2006.01)
(52) U.S. Cl. ......... 305/145; 305/125; 305/143; 305/149
(58) Field of Classification Search .................. 305/125, 305/143, 144, 145, 146, 149, 153, 155; 180/9.54
See application file for complete search history.

(56) References Cited

U.S. PATENT DOCUMENTS

| | | | |
|---|---|---|---|
| 2,561,901 A | 7/1951 | Bachman et al. |
| 2,716,577 A | 8/1955 | Land |
| 2,818,311 A | 12/1957 | Ashley, Jr. |
| 2,837,378 A | 6/1958 | Williams et al. |
| 2,959,451 A | 11/1960 | Weber |
| 3,216,772 A | 11/1965 | Day |
| 3,409,335 A | 11/1968 | Piepho et al. |
| 3,463,559 A | 8/1969 | Gehrke |
| 3,517,972 A | 6/1970 | Williams |
| 3,539,229 A | 11/1970 | Scully |
| 3,549,213 A | 12/1970 | Smith et al. |
| 3,645,586 A | 2/1972 | Piepho |
| 3,647,270 A | 3/1972 | Althaus |
| 3,692,368 A | 9/1972 | Alexander |
| 3,733,107 A | 5/1973 | Cote et al. |
| 3,741,331 A | 6/1973 | Kowalik |
| 3,789,942 A | 2/1974 | Kowalik |
| 3,841,715 A | 10/1974 | Comer, Jr. et al. |
| 3,901,563 A | 8/1975 | Day |
| 3,910,649 A * | 10/1975 | Roskaft ......................... 305/144 |
| 3,912,335 A | 10/1975 | Fisher |
| 3,938,651 A | 2/1976 | Alfred et al. |
| 3,963,047 A | 6/1976 | Moring |
| 3,972,569 A | 8/1976 | Bricknell |
| 3,980,351 A | 9/1976 | Orr et al. |
| 3,987,706 A | 10/1976 | Corrigan |
| 4,146,053 A | 3/1979 | Corrigan |
| 4,149,757 A * | 4/1979 | Meisel, Jr. .................... 305/146 |
| 4,204,810 A | 5/1980 | Vogel |
| 4,223,878 A | 9/1980 | Isaia et al. |
| 4,279,318 A | 7/1981 | Meisel, Jr. |
| 4,457,564 A | 7/1984 | Ruge et al. |

(Continued)

FOREIGN PATENT DOCUMENTS

WO        2004103657 A1    2/2004

OTHER PUBLICATIONS

PCT International Search Report, dated Jun. 25, 2008, and Written Opinion of the International Searching Authority, dated Jun. 25, 2008.

(Continued)

*Primary Examiner* — S. Joseph Morano
*Assistant Examiner* — Kip T Kotter

(57) ABSTRACT

An automatic track tensioning system is provided for use with a track-type work vehicle for automatically tensioning an endless track chain of the work vehicle.

10 Claims, 4 Drawing Sheets

U.S. PATENT DOCUMENTS

| | | | |
|---|---|---|---|
| 4,458,954 A | 7/1984 | Haas | |
| 4,514,014 A | 4/1985 | Balzer et al. | |
| 4,545,624 A * | 10/1985 | Van Ooyen | 305/9 |
| 4,571,863 A | 2/1986 | Freckleton et al. | |
| 4,681,376 A | 7/1987 | Riml | |
| 4,817,746 A | 4/1989 | Purcell et al. | |
| 4,819,754 A | 4/1989 | Purcell et al. | |
| 4,874,052 A | 10/1989 | Purcell et al. | |
| 4,881,609 A | 11/1989 | Purcell et al. | |
| 5,190,147 A | 3/1993 | Pennington | |
| 5,293,948 A | 3/1994 | Crabb | |
| 5,312,176 A | 5/1994 | Crabb | |
| 5,352,029 A | 10/1994 | Nagorcka | |
| 5,368,115 A | 11/1994 | Crabb | |
| 5,368,375 A | 11/1994 | Gustafson | |
| 5,378,204 A | 1/1995 | Urvoy | |
| 5,450,362 A | 9/1995 | Matsuzaki | |
| 5,738,421 A | 4/1998 | Neymans et al. | |
| 5,927,412 A | 7/1999 | Crabb | |
| 5,984,436 A | 11/1999 | Hall | |
| 6,024,183 A | 2/2000 | Dietz et al. | |
| 6,027,185 A | 2/2000 | Crabb | |
| 6,224,172 B1 * | 5/2001 | Goodwin | 305/145 |
| 6,249,994 B1 | 6/2001 | Oertley | |
| 6,276,768 B1 | 8/2001 | Miller | |
| 6,280,010 B1 | 8/2001 | Oertley | |
| 6,305,762 B1 | 10/2001 | Oertley | |
| 6,305,763 B1 | 10/2001 | Oertley | |
| 6,336,690 B2 | 1/2002 | Toms et al. | |
| 6,354,678 B1 | 3/2002 | Oertley | |
| 6,604,796 B2 | 8/2003 | Boyum | |
| 6,641,235 B2 | 11/2003 | Boyum | |
| 6,929,334 B2 | 8/2005 | Verheye et al. | |
| 7,555,901 B2 | 7/2009 | Dantlgraber | |
| 2001/0038245 A1 | 11/2001 | Toms et al. | |
| 2002/0171289 A1 | 11/2002 | Boyum | |
| 2002/0171290 A1 | 11/2002 | Boyum | |
| 2003/0117017 A1 | 6/2003 | Hoff | |
| 2005/0035654 A1 * | 2/2005 | Tamaru et al. | 305/145 |
| 2005/0231035 A1 | 10/2005 | Vertoni | |
| 2006/0207111 A1 | 9/2006 | Sugishita | |
| 2008/0265666 A1 | 10/2008 | Livesay et al. | |

OTHER PUBLICATIONS

Schematic of track tensioning system (admitted prior art).
GKN Sinter Metals SIKA® Ultra Precision Porous Metal Flow Restrictors (4 pages) (prior art).

* cited by examiner

AUTOMATIC TRACK TENSIONING SYSTEM

FIELD OF THE DISCLOSURE

The present disclosure relates to an automatic track tensioning system.

BACKGROUND OF THE DISCLOSURE

On each side of a track-type work vehicle, an undercarriage supports and propels an endless track chain that comprises a plurality of interconnected links. The track chain is entrained about a drive sprocket, for driving the track chain, and an idler. A track tensioner, also known as an idler recoil system, acts on the idler to apply tension to the track.

If the track tension is too loose or too tight, the track chain's service life may be reduced. In contrast, maintaining the proper track tension may extend the track chain's service life.

SUMMARY OF THE DISCLOSURE

According to the present disclosure, an automatic track tensioning system is provided for automatically tensioning an endless track chain of a track-type work vehicle. The automatic track tensioning system comprises a pressure inlet section and a track tensioner. The pressure inlet section comprises first and second pressure inlet portions. The inlet portions are arranged in non-series relation to one another, and they are adapted to be fluidly coupled to a pressure circuit on opposite sides of a pressure source (e.g., bi-directional pump) of the pressure circuit. The pressure inlet section receives pressure from the pressure source. The first and second pressure inlet portions are coupled to the track tensioner for communication of pressure received from the pressure circuit to the track tensioner.

Two embodiments of the automatic track tensioning system are disclosed. In the first embodiment, fluid of the pressure circuit fills the automatic track tensioning system for communication of pressure to the track tensioner.

In the second embodiment, the automatic track tensioning system comprises a first fluid circuit that comprises a first fluid and is adapted to be fluidly coupled to a pressure circuit to receive pressure therefrom, the first fluid being a first type of fluid, a second fluid circuit that comprises a second fluid, the second fluid being a second type of fluid, the first and second types of fluid being different from one another, and a track tensioner for tensioning an endless track chain and a pressure transmission device in fluid communication with the first and second fluid circuits to communicate pressure between the first and second fluid circuits but block fluid communication therebetween. Exemplarily, the first fluid is hydraulic oil, and the second fluid is grease.

According to an aspect of the present disclosure, the automatic track tensioning system comprises a flow restrictor in fluid communication with the track tensioner to restrict flow away from the track tensioner, wherein the flow restrictor is made of a porous material (e.g., porous metal or porous ceramic). It is made of such a material so as to prolong the period of time during which the pressure decays across the flow restrictor so that the pressure at the track tensioner, and, thus, the track tension, remains sufficiently elevated during, for example, operation of the work vehicle in reverse.

BRIEF DESCRIPTION OF THE DRAWINGS

The detailed description of the drawings refers to the accompanying figures in which.

DETAILED DESCRIPTION OF THE DRAWINGS

Figure 1:
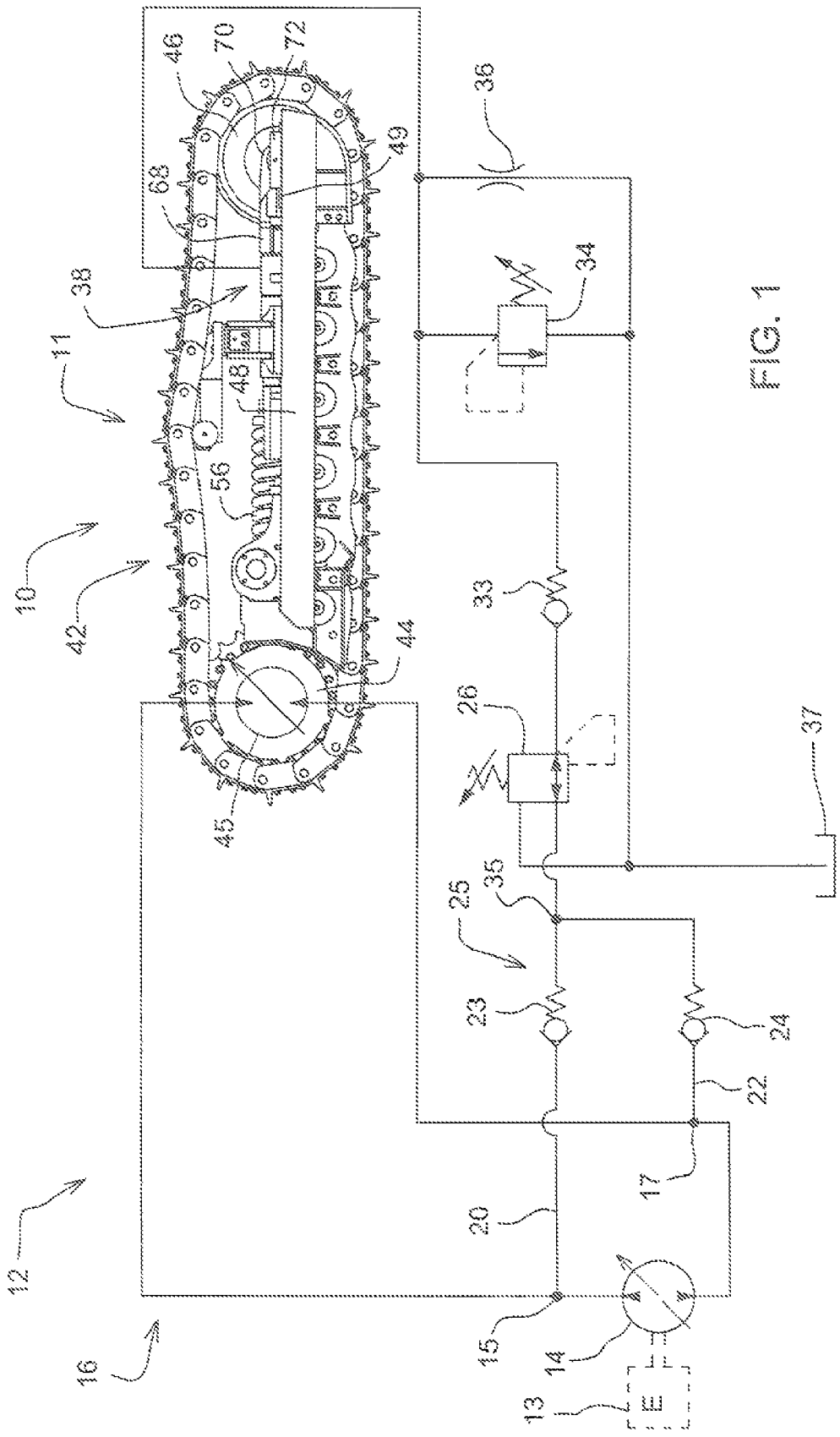
FIG. 1 is a diagrammatic view of a first automatic track tensioning system for use with an undercarriage of a track-type work vehicle.

Referring to FIG. 1, there is shown a first automatic track tensioning system 10 for use with an undercarriage 11 of a track-type work vehicle 12 to automatically tension an endless track chain 42 of the undercarriage 11. The automatic track tensioning system 10 comprises a pressure inlet section 25 and a track tensioner 38. The pressure inlet section 25 is fluidly coupled to opposite sides of a pressure source embodied, for example, as a bi-directional pump 14 of a pressure circuit 16 of the vehicle 12, in order to receive the relatively high pressure (100-400 bars) supplied by the bi-directional pump 14 in both directions of operation of the bi-directional pump 14. As a result the relatively high pressure is supplied to the pressure inlet section 25 for use by the track tensioner 38 at all times.

The pressure circuit 16 is, for example, a closed-loop hydraulic circuit configured exemplarily as a hydrostatic transmission for the undercarriage 11 to propel the track-type work vehicle 12. As such, it comprises the bi-directional pump 14 and a drive motor 45 to drive a drive sprocket 44. Exemplarily, an engine 13 of the track-type work vehicle 12 drives the bi-directional pump 14. It is to be understood that the pressure circuit 16 may be any pressure circuit of the track-type work vehicle 12 that can provide pressure for tensioning the track chain 42.

The pressure inlet section 25 comprises first and second pressure inlet portions 20, 22. The pressure inlet portions 20, 22 are arranged in non-series relation to one another, and are fluidly coupled to the pressure circuit 16 on respective opposite sides of the bi-directional pump 14. The first pressure inlet portion 20 comprises a first pressure inlet port 15 and a first check valve 23. The second pressure inlet portion 22 comprises a second pressure inlet port 17 and a second check valve 24. The pressure inlet section 25 further comprises a pressure outlet port 35 in fluid communication with the first and second pressure inlet portions 20, 22 and the inlet ports 15, 17 respectively thereof.

The first pressure port 15 is located fluidly between the bi-directional pump 14 and the first check valve 23 to connect the automatic track tensioning system 10 to the pressure circuit 16 on a first side of the bi-directional pump 14. The first and second pressure inlet portions 20, 22 are coupled to the track tensioner 38 for communication of pressure received from the pressure circuit 16 to the track tensioner 38. Similarly, the second pressure port 17 is located fluidly between the bi-directional pump 14 and the second check valve 24 to connect the automatic track tensioning system 10 to the pressure circuit 16 on an opposite, second side of the bi-directional pump 14.

The first check valve 23 is positioned fluidly in the first pressure inlet portion 20, between the first pressure port 15 and both the outlet port 35 and a pressure reducing valve 26. Likewise, the second check valve 24 is positioned fluidly in the second pressure inlet portion 22 between the second pressure port 17 and both the outlet port 35 and the pressure reducing valve 26. The first and second check valves 23, 24 cooperate to allow pump supply pressure to reach the pressure reducing valve 26, regardless of whether the bi-directional pump 14 is operating in forward or reverse. Although the first and second check valves 23, 24 are represented as spring check valves, other designs may also be acceptable.

The pressure reducing valve 26 is positioned fluidly between the pressure inlet section 25 and a check valve 33 to reduce the pressure of the pressure circuit 16 to a tensioning pressure (e.g., 20-30 bars). Although the pressure reducing valve 26 is represented as a variable pressure reducing valve, it may be fixed in other embodiments. Furthermore, the pressure reducing valve 26 is just one example of a device that may be used to reduce the pressure of the pressure circuit 16 to the tensioning pressure.

The check valve 33 is positioned fluidly between the pressure reducing valve 26 and the track tensioner 38. It allows the system fluid to travel from the pressure reducing valve 26 to the track tensioner 38, but it does not allow travel in the opposite direction. Although the check valve 33 is represented as a spring check valve, other check valve designs may also be acceptable.

Ultimately, the automatic track tensioning system 10 communicates the tensioning pressure to the track tensioner 38. The track tensioner 38 acts between the frame 48 and the idler 46 to transmit a corresponding tensioning force to the idler 46 which, in turn, tensions the chain 42 with the tensioning force.

A pressure relief valve 34 is positioned fluidly between the track tensioner 38 and a reservoir 37, and acts as a shock relief valve to relieve sudden, potentially damaging increases in the tensioning pressure, (e.g., shock loading). Although the pressure relief valve 34 is represented as a variable pressure relief valve, it may be fixed in other embodiments.

A flow restrictor 36 is positioned fluidly between the track tensioner 38 and the reservoir 37, and it is in parallel with the pressure relief valve 34. The flow restrictor 36 is in fluid communication with the track tensioner 38 to restrict flow away from the track tension 38, such as during operation of the vehicle 12 in reverse. Reverse operation of the vehicle 12 calls for a relatively high pressure (e.g., 100-200 bars) at the track tensioner 38 to maintain a proper tension in the chain 42. The flow restrictor 36 is configured so as to prolong discharge of the tensioning pressure at the track tensioner 38 while the vehicle 12 is driven in reverse. A typical reverse operation of the vehicle 12 may last 1.0-1.5 minutes. The flow restrictor 36 is a fixed restriction. The flow restrictor 36 is made of porous material to keep the tensioning pressure sufficiently elevated during this period of time of reverse operation, after which the tensioning pressure will discharge across the flow restrictor 36 to a lower pressure (e.g., 20-30 bars, as determined by the pressure reducing valve 26) suitable for forward operation of the vehicle. The porous material may be, for example, a porous metal material (e.g., sintered powder metal material, SIKA® Ultra Precision Porous Metal Flow Restrictor available from GKN Sinter Metals Filters located in Addison, Ill.) or a porous ceramic material.

The flow restrictor 36 also acts to gradually relieve pressure in the track tensioner 38 during, for example, chain packing conditions when mud, dirt, ice, or other debris may accumulate in the undercarriage 11. During such times, the flow restrictor 36 meters flow away from the track tensioner 38 to lower the tensioning pressure.

Figure 2:
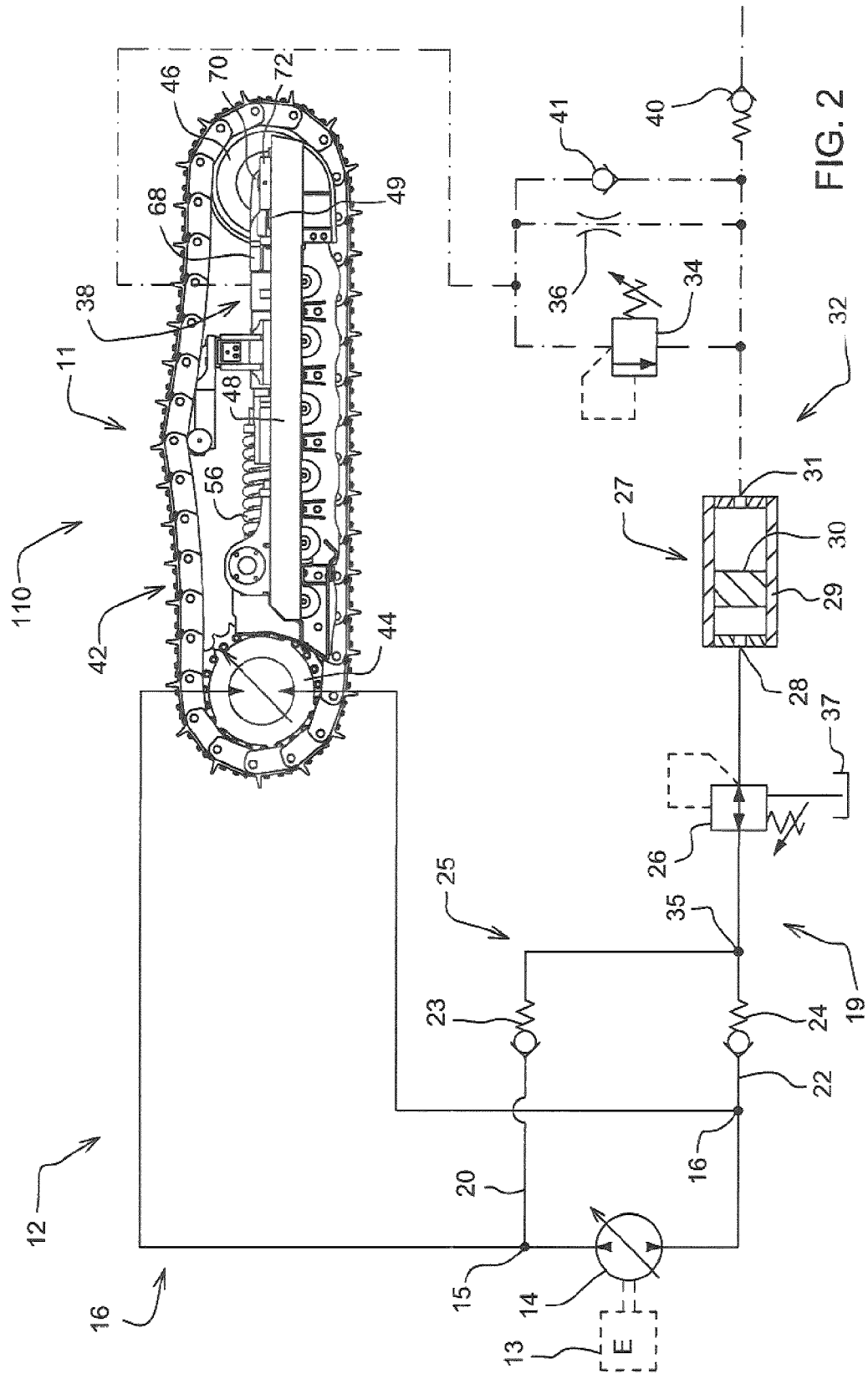
FIG. 2 is a diagrammatic view of a second automatic track tensioning system for use with an undercarriage of a track-type work vehicle.

Referring to FIG. 2, there is shown a second automatic track tensioning system 110. A difference between the first and second automatic track tensioning systems 10, 110 is that the first automatic track tensioning system 10 uses just one kind of fluid, the system fluid (i.e., the fluid of the pressure circuit 16), and the second automatic track tensioning system 110 comprises two fluids, a first fluid and a second fluid. The first fluid is a first type of fluid, and the second fluid is a second type of fluid. The first and second types of fluid are different from one another. Still, the second automatic track tensioning system 110 has several components similar in structure and function as the first automatic track tensioning system 10, as indicated by use of identical reference numbers where applicable.

The second automatic track tensioning system 110 comprises a first fluid circuit 19, adapted to be fluidly coupled to the pressure circuit 16; a second fluid circuit 32 comprising the track tensioner 38; and a pressure transmission device 27 arranged to communicate pressure between the first and second fluid circuits 19, 32, but block fluid communication therebetween. The first fluid circuit comprises a first fluid; the pressure inlet portions 20, 22; and the pressure reducing valve 26. The first fluid fills the pressure circuit 16 and the first fluid circuit 19, because the first fluid circuit 19 and the pressure circuit 16 are in fluid communication with one another. Using the first fluid, the first fluid circuit 19 communicates pressure from the pressure circuit 16 to the pressure transmission device 27. The first fluid may be, for example, hydraulic oil.

Pressure from the pressure circuit 16 is transmitted to the tensioner 38 via the first fluid circuit 19, the pressure transmission device 27, and the second fluid circuit 32. The pressure reducing valve 26 of the first fluid circuit reduces the pressure of the pressure circuit 16 to the tensioning pressure (e.g., 20-30 bars), which is transmitted to the second fluid circuit 32 via the pressure transmission device 27.

The pressure transmission device 27 is positioned fluidly between the first and second fluid circuits 19, 32. Exemplarily, the pressure transmission device 27 comprises a housing 29; a piston 30; a first pressure transmission port 28 formed in the housing 29 and in fluid communication with the first fluid circuit 19; and a second pressure transmission port 31 formed in the housing 29 and in fluid communication with the second fluid circuit 32. The piston 30 is positioned within the housing 30 between the ports 28, 31 for translation therebetween in response to pressure differences between the circuits 19, 32. As such, the piston 30 communicates pressure between the first and second fluid circuits 19, 32, but blocks fluid communication therebetween.

Exemplarily, the second fluid circuit 32 comprises the second fluid, the pressure relief valve 34, the flow restrictor 36, a check valve 40, and a check valve 41. The pressure relief valve 34, the flow restrictor 36, and the check valve 41 are positioned fluidly between the pressure transmission device 27 and the track tensioner 38 in parallel with one another. The second fluid circuit 32 transmits pressure via the check valve 41 from the pressure transmission device 27 to the track tensioner 38. The second fluid, which fills the second fluid circuit 32 for communication of pressure therein, may be, for example, grease.

The pressure relief valve 34 and the flow restrictor 36 operate in a similar manner as previously described. However, in this embodiment, reverse flow through these components is directed to the pressure transmission device 27 instead of directly to the reservoir 37. As such, excess pressure present in the second fluid circuit 32 acts against the piston 30 to urge it toward the first fluid circuit 19 which, in turn, may cause fluid in the first fluid circuit 19 to drain to the reservoir 37 via the pressure reducing valve 26.

The check valve 41 is positioned fluidly between the pressure transmission device 27 and the track tensioner 38. The check valve 41 allows the second fluid to flow away from the pressure transmission device 27 toward the track tensioner 38, but not in the opposite direction. The check valve 41 may or may not be a spring check valve.

Check valve 40 allows an operator to add the second fluid to the second fluid circuit 32 as needed. Although the check valve 40 is represented as a spring check valve, other designs may also be acceptable.

The second fluid circuit 32 applies the tensioning pressure to the track tensioner 38. The track tensioner 38 acts between the frame 48 and the idler 46 to transmit a corresponding tensioning force to the idler 46 which, in turn, tensions the chain 42 with the tensioning force.

Figure 3:
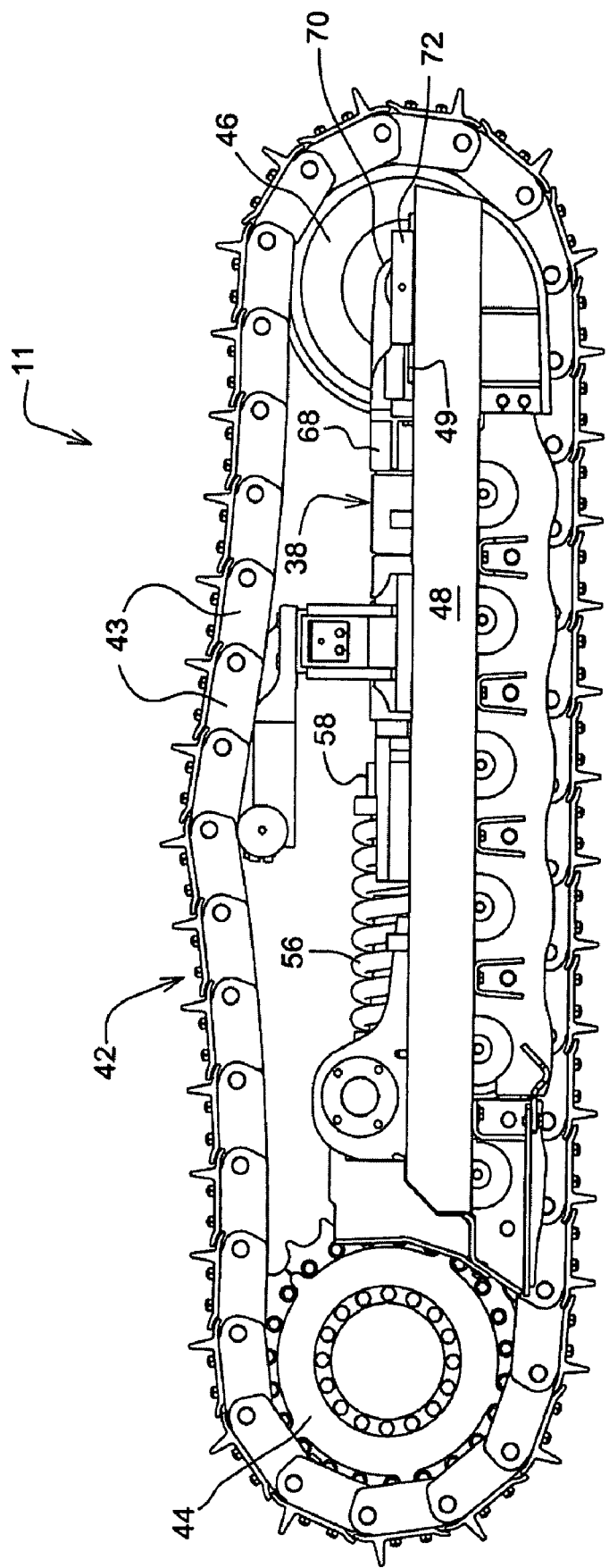
FIG. 3 is a side elevational view of an undercarriage of a track-type work vehicle.

Referring to FIG. 3, the undercarriage 11 supports and propels the track chain 42, which comprises a plurality of interconnected links 43. The track chain 42 is entrained about the drive sprocket 44 and the idler 46. The track tensioner 38 acts between the frame 48 and the idler 46 to transmit the tensioning force to the idler 46.

Figure 4:
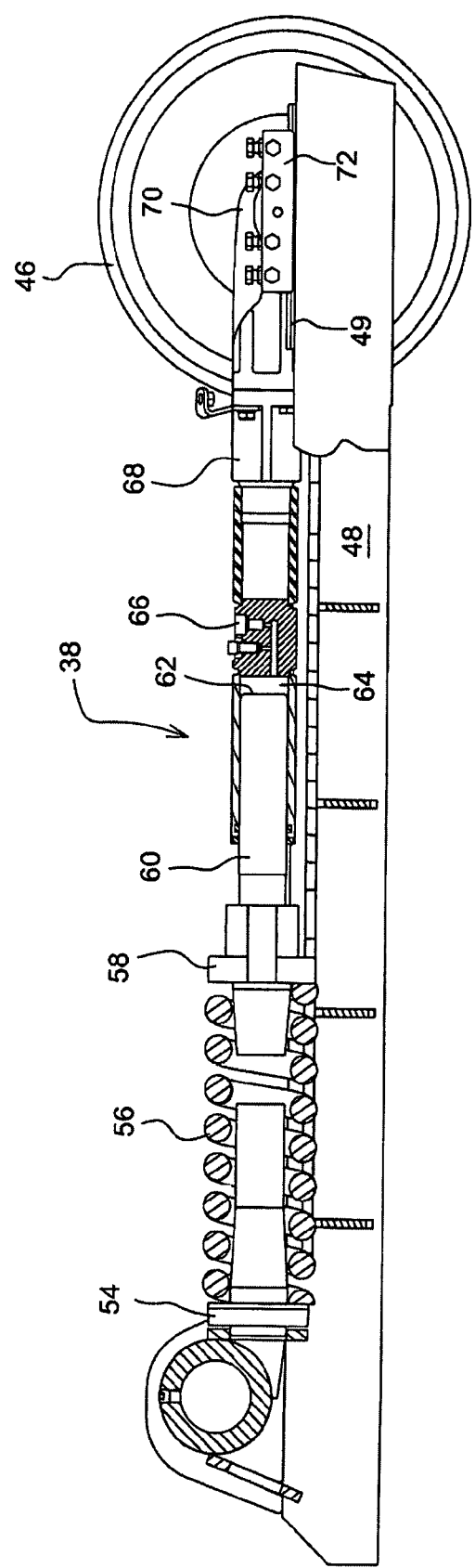
FIG. 4 is an enlarged sectional view of a track tensioner.

Referring to FIG. 4, there is shown an example of a track tensioner 38 in the form of an idler recoil assembly. The track tensioner 38 acts between the frame 48 and the idler 46 to transmit the tensioning force to the idler 46. The track tensioner 38 shown in FIG. 4 may be used with automatic track tensioning system 10 or 110.

Exemplarily, the track tensioner 38 comprises a spring mount or tube 54, a compression spring 56, a cap 58, a piston 60, a chamber 64, a tensioning pressure port 66, a yoke 68, a journal 70, and a guide 72. The tube 54 provides a connection between the frame 48 and the compression spring 56. The compression spring 56 of the track tensioner 38 is also connected to the cap 58 and allows the entire track tensioner 38 to oscillate along a frame rail 49.

The tensioning pressure port 66 is fluidly coupled to the remainder of the automatic track tensioning system 10 or 110 to communicate the tensioning pressure to the track tensioner, and, in particular, the piston face 62 in the chamber 64. The surface area of the piston face 62 and the chamber 64 convert the tensioning pressure into the tensioning force. The yoke 68, the journal 70, and the guide 72 cooperate to transmit the tensioning force to the idler 46.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work vehicle, comprising:
an endless track chain,
a track tensioner for tensioning the endless track chain,
a pressure circuit comprising a bi-directional pump, and
a pressure inlet section associated with the track tensioner, wherein the pressure inlet section comprises first and second pressure inlet portions arranged in non-series relation to one another and fluidly coupled to the pressure circuit on respective opposite sides of the bi-directional pump to receive pressure from the bi-directional pump, the first and second pressure inlet portions coupled to the track tensioner for communication of pressure received from the opposite sides of the bi-directional pump to the track tensioner.

2. The work vehicle of claim 1, wherein each of the first and second pressure inlet portions comprises a check valve.

3. The work vehicle of claim 1, comprising a normally open pressure reducing valve positioned to reduce pressure, received by the first and second pressure inlet portions, to a tensioning pressure.

4. The work vehicle of claim 3, comprising a check valve positioned fluidly between the pressure reducing valve and the track tensioner, wherein the check valve is openable towards the track tensioner.

5. The work vehicle of claim 1, comprising a flow restrictor in fluid communication with the track tensioner to restrict flow away from the track tensioner, wherein the flow restrictor is made of a porous material.

6. The work vehicle of claim 5, comprising a pressure relief valve in parallel with the flow restrictor.

7. The work vehicle of claim 1, wherein the first pressure inlet portion comprises a first check valve, the second pressure inlet portion comprises a second check valve, and the track-type work vehicle further comprises a normally open pressure reducing valve positioned between the first and second pressure inlet portions and the track tensioner to reduce pressure, received by the first and second pressure inlet portions, to a tensioning pressure, a third check valve positioned fluidly between the pressure reducing valve and the track tensioner and openable towards the track tensioner, a flow restrictor positioned fluidly between the third check valve and the track tensioner and made of a porous material to restrict flow away from the track tensioner, and a pressure relief valve in parallel with the flow restrictor.

8. The work vehicle of claim 1, wherein the first pressure inlet portion comprises a first pressure inlet port of the pressure inlet section, the second pressure inlet portion comprises a second pressure inlet port of the pressure inlet section, the first and second pressure inlet ports are fluidly coupled respectively to the opposite sides of the bi-directional pump, and the pressure inlet section comprises a pressure outlet port in fluid communication with the first and second pressure inlet portions.

9. The work vehicle of claim 1, wherein the pressure circuit is configured as a hydrostatic transmission.

10. The work vehicle of claim 9, further comprising a drive sprocket about which the endless track chain is entrained, wherein the hydrostatic transmission comprises a drive motor in fluid communication with the bi-directional pump to drive the drive sprocket.

* * * * *